United States Patent [19]

Esserman

[11] Patent Number: 5,262,878
[45] Date of Patent: Nov. 16, 1993

[54] METHOD AND APPARATUS FOR COMPRESSING DIGITAL STILL PICTURE SIGNALS

[75] Inventor: James N. Esserman, San Diego, Calif.

[73] Assignee: General Instrument Corporation, Hatboro, Pa.

[21] Appl. No.: 714,882

[22] Filed: Jun. 14, 1991

[51] Int. Cl.$^5$ ............................................. H04N 1/387
[52] U.S. Cl. ................................... 358/453; 358/448; 358/426; 358/430; 358/433; 358/443; 358/404; 358/444
[58] Field of Search ............... 358/453, 433, 448, 426, 358/430, 105, 135, 133, 125, 404, 444; 382/56, 27, 42

[56] References Cited

U.S. PATENT DOCUMENTS

| | | | |
|---|---|---|---|
| 4,281,312 | 7/1981 | Knudson | 358/433 |
| 4,862,264 | 8/1989 | Wells et al. | 358/138 |
| 4,887,156 | 12/1989 | Ohki | 358/133 |
| 4,942,465 | 7/1990 | Ohta | 358/133 |
| 4,949,176 | 8/1990 | Levy | 358/135 |
| 5,065,447 | 11/1991 | Barnsley et al. | 358/433 |
| 5,109,437 | 4/1992 | Honda | 358/433 |
| 5,113,457 | 5/1992 | Enomoto et al. | 358/433 |
| 5,134,478 | 7/1992 | Golin | 358/135 |
| 5,148,292 | 9/1992 | Kutaragi | 358/433 |

OTHER PUBLICATIONS

Ninomiya and Ohtsuka, "A Motion-Compensated Interframe Coding Scheme for Television Pictures," IEEE Transactions on Communications, vol. COM-30, No. 1, Jan. 1982.

Ericsson, "Fixed and Adaptive Predictors for Hybrid Predictive/Transform Coding," IEEE Transactions on Communications, vol. COM-33, No. 12, Dec. 1985.

Primary Examiner—Edward L. Coles, Sr.
Assistant Examiner—Fan Lee
Attorney, Agent, or Firm—Barry R. Lipsitz

[57] ABSTRACT

Digital still picture signals are processed for compression. A picture signal is divided into successive blocks containing data corresponding to different portions of a still picture. A selected block for the still picture is compared to an area of the picture defined by a plurality of previous blocks to try to locate a set of data in the area that is similar to the selected block. An error signal is generated that indicates the difference between the selected block and the best fit block of previously received data for the picture. Both the error signal and the current block are compressed. The amount of data in the compressed error signal is compared to the amount of data in the compressed current block to determine which provides the least amount of data for communication to a data receiver. An offset vector is appended to each selected error signal to identify the portion of the previously received picture data in which the corresponding best fit block resides. A data receiver recovers the digital still picture data by applying the offset vector for each received compressed error signal to a previously received area of the still picture data to recover the best fit block required to recreate the current data set from the received error signal.

16 Claims, 2 Drawing Sheets

METHOD AND APPARATUS FOR COMPRESSING DIGITAL STILL PICTURE SIGNALS

BACKGROUND OF THE INVENTION

The present invention relates to the compression of digital data, and more particularly to a method and apparatus for processing digitized still picture signals for transmission or storage in a compressed form.

The communication and storage of still pictures, which may include graphics and/or text, has become commonplace with the advent of techniques for digitizing picture signals. Applications for such technology include facsimile, medical diagnostics, the publication of books and periodicals on compact disc read-only memories (CD-ROM), and the like.

A substantial amount of digital data must be stored (e.g., on a CD-ROM) or transmitted (e.g., via satellite) in any digital picture communication system. In order to most efficiently use the available storage capacity or radio frequency spectrum, it is advantageous to compress the digital picture signals to minimize the amount of data that must be stored or transmitted. Video compression techniques are known for efficiently transmitting digital video signals over conventional communication channels, for example in the transmission of video television signals via satellite or cable. Such techniques use compression algorithms that take advantage of the correlation among adjacent pixels in order to derive a more efficient representation of the important information in a video signal.

The most powerful compression systems not only take advantage of spatial correlation, but can also utilize similarities among adjacent frames of a television picture to further compact the data. In such "interframe" systems, differential encoding is used to transmit only the difference between an actual frame and a prediction of the actual frame. The prediction is based on information derived from a previous frame of the same video sequence. Examples of such systems can be found in Ninomiya and Ohtsuka, "A Motion-Compensated Interframe Coding Scheme for Television Pictures", *IEEE Transactions on Communications*, Vol. COM-30, No. 1, Jan. 1982 and Ericsson, "Fixed and Adaptive Predictors for Hybrid Predictive/Transform Coding", *IEEE Transactions on Communications*, Vol. COM-33, No. 12, Dec. 1985, both incorporated herein by reference.

The techniques described in the aforementioned articles relate to "motion compensation" techniques that are applicable to successive frames of a television picture. Such techniques do not address the compression of digitized still pictures. In applications where a succession of different still pictures are stored or transmitted, there is little or no correlation between the content of the successive images. In such applications, motion compensation techniques that rely on the prediction of current video data from the video content of a previous frame would most likely produce error signals that contain more, rather than less data. This would defeat the benefits of signal compression.

It would be advantageous to provide a method and apparatus for compressing digitized still pictures in order to reduce the volume of data that must be communicated to a data receiver in order to store or transmit the picture information. It would be further advantageous to provide such a system that would work in combination with known motion compensation systems in the transmission of digital television signals. The present invention provides a method and apparatus enjoying the aforementioned advantages.

SUMMARY OF THE INVENTION

The present invention provides a method for processing digital picture signals for communication to a data receiver. The data receiver can comprise, for example, a storage device such as a CD-ROM. Alternatively, the data receiver could be a data decoder for receiving the picture signals from a communication network and providing them in a proper format for display on a television set or the like.

In accordance with the invention, the picture signal is divided into successive data sets (e.g., blocks) containing data corresponding to different portions of a still picture. A selected data set for the still picture is compared to an area of the picture defined by a plurality of previously compressed and decompressed data sets stored in memory, to try to locate a set of data in said area that is similar to the selected data set. An error signal is generated which is indicative of the difference between the selected data set and a set of data located during the picture area comparing step. The error signal and the selected data set are then compressed. The amount of data in the compressed error signal and offset vector is compared to the amount of data in the compressed selected data set to determine which provides the least amount of data for communication to the data receiver.

In a preferred embodiment, the set of data located during the picture area comparing step comprises the best match between the selected data set and the data contained in the picture area. An offset vector is appended to the error signal to identify the portion of the area in which the set of data located during the picture area comparing step resides. The offset vector can be compressed to further reduce the amount of data to be transmitted or stored. The signal that provides the least amount of data for communication to the data receiver is encoded to identify it as a compressed error signal and offset vector or a compressed selected data set.

At a receiver, the received data is identified as a compressed error signal and offset vector or a compressed selected data set. If the received signal is identified as a compressed error signal and offset vector, the offset vector is obtained. The received data is decompressed, and the offset vector is applied (after decompression, if received in a compressed form) to previously received data for the still picture to recover a set of data therefrom that is equivalent to that from which the error signal was derived at the transmitter. The recovered set of data is added to the decompressed, received error signal to recreate a selected data set at the receiver.

Apparatus is provided for processing digital picture signals for communication to a data receiver. A block formatter or the like is provided for dividing a picture signal into data sets (e.g., blocks) containing data corresponding to different portions of a still picture. Means are coupled to receive the data sets for comparing a current data set of the still picture to an area of the picture defined by a plurality of previously compressed and decompressed data sets stored in memory, to try to locate a set of data in said area that is similar to the current data set. An error signal is generated indicative of the difference between the current data set and a set located by the picture area comparing means. An offset vector is generated to identify the portion of said area in which said set located by the picture area comparing means resides. First means are provided for compressing the error signal, and second means compress the current data set. Third means can optionally be provided to compress the offset vector. Means coupled to the first and second compressing means and coupled to receive the offset vector compare the amount of data in the compressed error signal and offset vector to the amount of data in the compressed current data set to determine which provides the least amount of data for communication.

In a preferred embodiment, the picture area comparing means locate the best match between the current data set and the data contained in said area. The signal that provides the least amount of data for communication is encoded to identify it as a compressed error signal and offset vector or a compressed current data set.

A data receiver in accordance with the present invention recovers data communicated from the digital picture signal processing apparatus. Means are provided in the data receiver for identifying whether a particular block of received data is a compressed error signal and offset vector or a compressed current data set. Means responsive to the identifying means decompress the received data, and obtain the appended offset vector from data identified as a compressed error signal. If received in a compressed form, the offset vector is decompressed at the receiver. The offset vector is used to address a memory that stores previously received data, in order to recover a set of data corresponding to that from which an identified error signal was derived. The recovered set of data is then added to the error signal to recreate a current data set at the receiver.

The present invention also provides a data receiver for recovering digital still picture data from a compressed error signal indicative of the difference between a current data set and previously received area of a still picture. Received data is identified as a compressed error signal or a compressed current data set. Means responsive to the identification decompress the received data. Where received data is identified as a compressed error signal, an appended offset vector is obtained, decompressed if necessary, and applied to a previously received area of still picture data to recover a set of data corresponding to that from which the identified error signal was derived. The recovered set of data is added to the error signal to recreate a current data set at the receiver.

DETAILED DESCRIPTION OF THE INVENTION

The present invention relates to the processing of digital still picture data to facilitate the communication of the data to a data receiver in a compressed form. The data is processed so that at a receiver, a full set of data can be reconstructed from an error signal derived from a block of data contained in a previously received portion of the still picture. Thus, the invention applies differential coding techniques (e.g., differential pulse code modulation—DPCM) previously known for interframe processing to a purely intraframe processing scheme.

Figure 1:
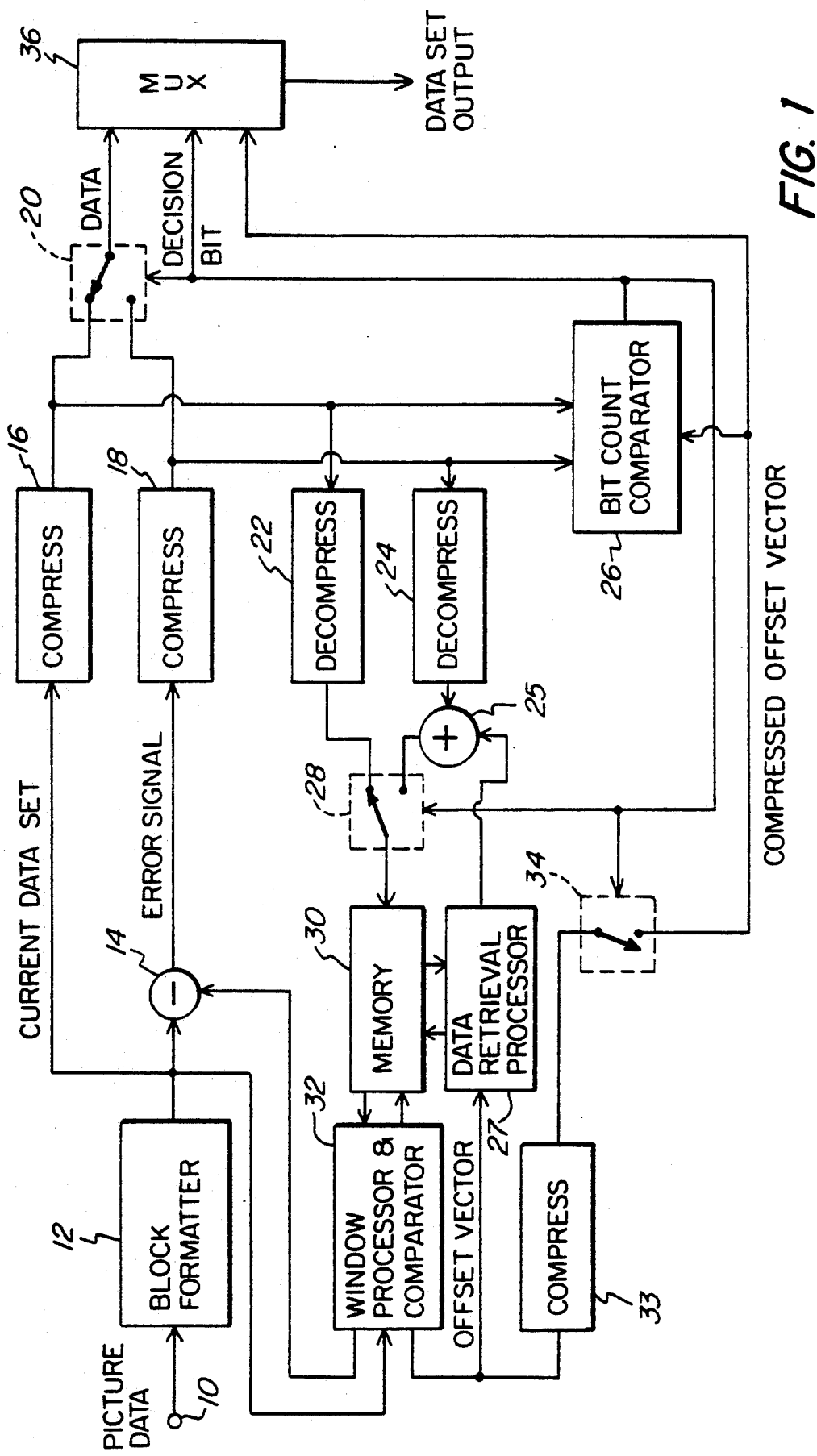
FIG. 1 is a block diagram of digital still picture processing apparatus in accordance with the present invention.

A processor in accordance with the invention is illustrated in FIG. 1. Picture data in a conventional digital format is input at a terminal 10 to a block formatter 12 that divides the picture signal into successive data sets (e.g., blocks of 8×8 pixels) each containing data corresponding to an associated portion of a still picture. Each block output from block formatter 12 is input to a compression circuit 16 and, via a subtraction circuit 14 to a second compression circuit 18. The compression circuits can process the blocks according to the same or different compression algorithms. For example, each of compression circuits 16, 18 can comprise circuitry for applying a discrete cosine transform (DCT) followed by run length coding and Huffman coding as well known in the art.

The output of each of compression circuits 16, 18 is input to a bit count comparator 26 comprising, for example, a well known hardware bit counter coupled to a comparator. Those skilled in the art will appreciate that bit count comparator 26 can alternatively be implemented in software using well known techniques. Bit counter 26 also receives an offset vector, which in the event an optional compression circuit 33 is provided, will be in a compressed form. The offset vector corresponds to a compressed error signal output from compression circuit 18. The function of bit count comparator 26 is to compare the amount of data provided by compression circuitry 16 to the amount of data provided by compression circuitry 18 with the offset vector appended thereto. The compressed signal providing the least data (i.e., having the lowest bit count for a given block) is then selected via a decision bit output from bit count comparator 26, that controls a switch 20 to output the selected data to a multiplexer 36 for communication to a receiving device. Multiplexer 36 combines the selected data with the decision bit and an offset vector (if the compressed error signal is sent) for use by the data receiver.

The outputs from compression circuitry 16, 18 are also input to corresponding decompression circuits 22, 24. These circuits return the compressed data to its decompressed state for selective input via switch 28 to a memory that stores the data in the same order in which it is received at input terminal 10. When the decision bit output from bit count comparator 26 causes decompressed data from circuitry 16 to be sent to the multiplexer 36, it also actuates switch 28 to output the corresponding decompressed data from decompression circuit 22 to memory 30. Conversely, when the decision bit causes the compressed data from compression circuitry 18 to be output, it also causes switch 28 to pass the decompressed data from decompression circuitry 24 to memory 30. When the compressed error signal from compression circuitry 18 is selected by the decision bit, it is restored to a full data set before it is passed to memory 30 by adding the necessary previous picture area data back in at an adder 25. A data retrieval processor 27 obtains the previous data from a memory 30 in response to an offset vector corresponding to the error signal. The offset vector is generated by a window processor and comparator circuit 32 as described below. Memory 30 will therefore contain the equivalent of the data sets output from block formatter 12, after compression and decompression and, in the case where the error signal is chosen by bit count comparator 26, after restoration of the error signal to a full data set.

The data sets stored in memory 30 are used by a window processor and comparator 32 to compare each current block of data output from block formatter 12 (each block corresponding to a portion of a still picture) to a "window" area of the still picture defined by a plurality of previous data sets stored in memory 30, in order to locate a set of data in memory 30 that is similar to the current data block. The comparison of the current block to the data contained in the window area is made over the entire window area, and is not limited to the individual block boundaries of the data blocks that fill the window area. Window processor and comparator 32 outputs the data set from memory 30 that best matches the current block of data appearing at the output of block formatter 12. The best match data output from window processor and comparator 32 is subtracted at subtractor 14 from the current data set to provide the error signal for input to compression circuitry 18. As noted above, window processor and comparator 32 also outputs an offset vector, which can optionally be compressed at a conventional compression circuit 33, to a switch 34. The offset vector identifies the portion of the picture area stored in memory 30 in which the best match data set resides. Switch 34 is closed by the decision bit from bit count comparator 26 whenever the compressed error signal from compression circuitry 18 is selected for output to multiplexer 36. Thus, when the compressed error signal is the data set output from multiplexer 36, it will be combined not only with the decision bit from bit count comparator 26, but also with the offset vector (shown compressed in FIG. 1) that identifies the location in previous portions of the still picture where the best match data resides. In this manner, a receiver can use the offset vector to find the best match data at the receiving end in order to recreate a full current data set from a received compressed error signal.

The apparatus of FIG. 1 will successively process the data for a still picture on a block-by-block basis until compressed data representing the entire still picture has been output from multiplexer 36. The output of multiplexer 36 can be coupled to a transmitter for transmitting the compressed still picture data via a satellite communication path or the like to a picture receiver, or coupled to a device for recording the compressed data for future use.

Figure 2:
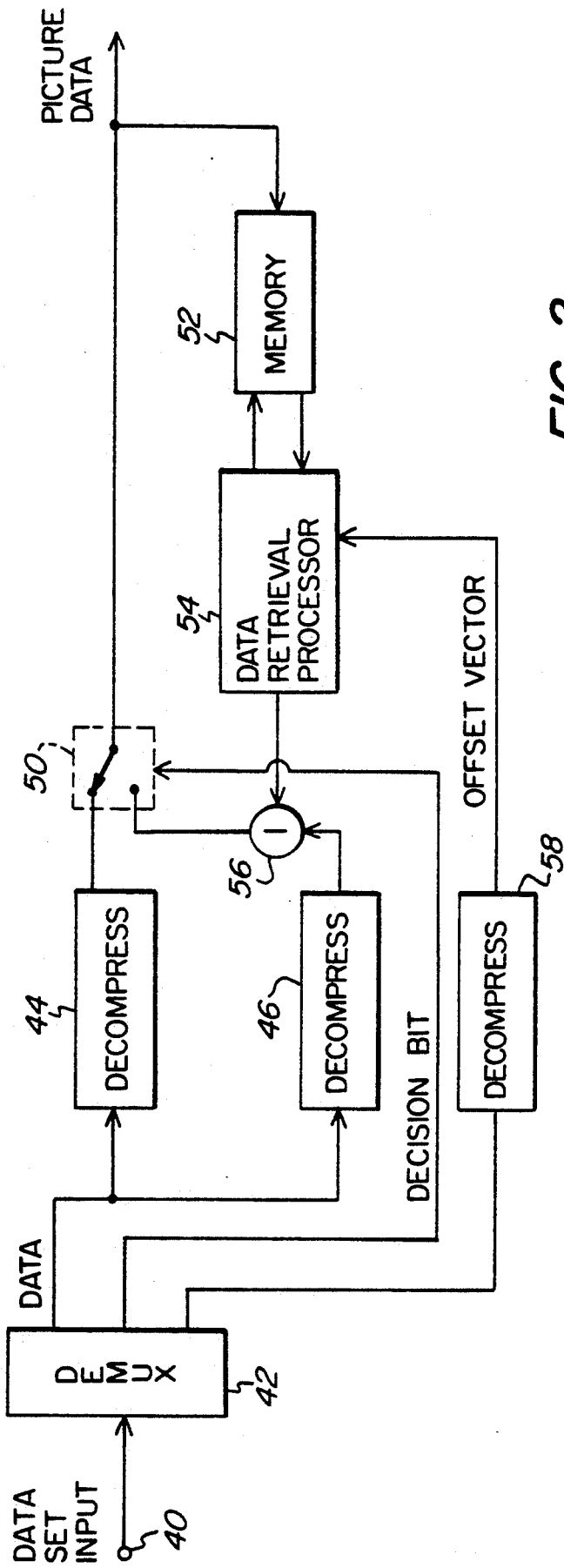
FIG. 2 is a block diagram of a receiver for receiving and processing data sets output from the apparatus of FIG. 1.

FIG. 2 illustrates a data receiver for use in recovering still picture data from the apparatus of FIG. 1. The compressed data sets output from multiplexer 36 are received at an input terminal 40 via an appropriate communication path. The received data is demultiplexed in a demultiplexer 42 to recover the data sets, decision bit, and offset vector (if present) information. The retrieved data is input to a first decompression circuit 44 corresponding to compression circuit 16, and a second decompression circuit 46 corresponding to compression circuit 18. The retrieved decision bit controls a switch 50 to output picture data from decompression circuit 44 when the received data corresponds to data output from compression circuitry 16 of FIG. 1. Switch 50 outputs a reconstructed current data set from adder 56 when the data retrieved by demultiplexer 42 comprises a compressed error signal output from compression circuit 18 of FIG. 1.

In order to recover a current data set from a received compressed error signal, memory 52 and data retrieval processor 54 are provided. Memory 52 is coupled to the output of switch 50 in order to store all picture data recovered by the data receiver. Thus, when a new data set is received at input terminal 40, the picture data recovered from all previous data sets has already been stored in memory 52. When a compressed error signal is received by the data receiver, a corresponding offset vector will also be received. If compressed offset vectors are provided by the data transmitter, a corresponding decompression circuit 58 will be provided in the receiver to decompress the received offset vectors. In response to a received offset vector, data retrieval processor 54 will recover the necessary previous data set from memory 52. The data set retrieved from memory 52 is that corresponding to the data set from which the original error signal was derived. By adding the retrieved data set at adder 56 to the decompressed error signal output from decompression circuit 46, the full current data set is reproduced for output via switch 50 to a video display or the like.

It should now be appreciated that the present invention provides a system for compressing digital still picture signals. A best estimate for a current data set is made by finding its best match with previously received pixel data contained in a window area. For example, a sum of the squares or sum of the absolute value approach could be used to estimate which area of the window is most similar to the current data set. Alternatively, the best match can be located by finding the difference signals between the current data set and each data set within the window, compressing the difference signals, counting the number of bits in each one, and selecting the data set that provides the difference signal having the fewest number of bits. A commercially available motion estimation integrated circuit chip can be used to implement window processor and comparator 32 in order to find the best fit within a given search window.

After the best fit data set is located, an error signal is formed by taking the difference between the best fit block and the current block. This error signal is then compressed for transmission or storage. If the number of bits required to transmit the offset vector and the compressed error signal is less than the number of bits required just to send the compressed current data set, then the compressed error signal is transmitted or stored together with the decision bit and offset vector. Otherwise, the current data set is transmitted or stored together with the decision bit. In order to improve coding efficiency, the offset vectors can also be compressed.

In the illustrated embodiment, the choice as to whether to use the compressed current data set or compressed error signal and offset vector is made by comparing the actual number of bits in each alternative. It should be appreciated that other tests could be substituted for selecting between these alternatives. However, such approaches may cause an increase in the number of bits that will be output.

Although the invention has been described in accordance with a preferred embodiment thereof, those skilled in the art will appreciate that numerous adaptations and modifications may be made thereto, without departing from the spirit and scope of the invention as set forth in the claims.

What is claimed is:

1. A method for processing digital picture signals comprising the steps of:

dividing a picture signal into a succession of data sets containing data corresponding to different portions of a still picture;

comparing a selected data set from said succession to an area in a previous portion of said still picture defined by a plurality of previous data sets in said succession to try to locate a set of data in said area that is similar to said selected data set;

generating an error signal indicative of the difference between said selected data set and a set of data located during said picture area comparing step;

compressing said error signal;

appending an offset vector to said compressed error signal to identify the portion of said area in which the set of data located during said picture area comparing step resides;

compressing said selected data set; and comparing the amount of data in said compressed error signal and appended offset vector to the amount of data in said compressed selected data set to determine which provides the least amount of data for communication to a data receiver.

2. A method in accordance with claim 1 wherein the set of data located during said picture area comparing step comprises the best match between said selected data set and the data contained in said picture area.

3. A method in accordance with claim 1 comprising the further step of:

compressing said offset vector prior to appending it to said error signal.

4. A method in accordance with claim 3 comprising the further step of:

encoding the signal that provides the least amount of data for communication to identify it as a compressed error signal and offset vector or a compressed selected data set.

5. A method in accordance with claim 1 comprising the further step of:

encoding the signal that provides the least amount of data for communication to identify it as a compressed error signal and offset vector or a compressed selected data set.

6. A method in accordance with claim 5 comprising the further steps of:

receiving the communicated data at a receiver decompressing the received data;

identifying the received data as a compressed error signal and offset vector or a compressed selected data set; and, in the event the received data is a compressed error signal and offset vector:

obtaining the offset vector from the received data;

applying said offset vector to recover, from previously received data, a set of data equivalent to that from which the error signal was derived; and adding the recovered set of data to the received error signal to recreate a selected data set at the receiver.

7. A method in accordance with claim 1 wherein the second comparing step compares the number of bits in the compressed error signal and appended offset vector to the number of bits in the compressed selected data set to determine which has the fewest number of bits and therefore the least amount of data.

8. Apparatus for processing digital picture signals comprising:

means for dividing a picture signal into data sets containing data corresponding to different portions of a still picture;

means coupled to receive the data sets for comparing a current data set of said still picture to an area in a previously received portion of said still picture defined by a plurality of previously received data sets to try to locate a set of data in said area that is similar to said current data set;

means for generating an error signal indicative of the difference between said current data set and a set located by said picture area comparing means;

first means for compressing said error signal;

second means for compressing said current data set;

means for appending an offset vector to said compressed error signal to identify the portion of said area in which the set located by said picture area comparing means resides; and means coupled to said first and second compressing means for comparing the amount of data in said compressed error signal and appended offset vector to the amount of data in said compressed current data set to determine which provides the least amount of data for communication.

9. Apparatus in accordance with claim 8 wherein said picture area comparing means locate the best match between said current data set and the data contained in said area.

10. Apparatus in accordance with claim 8 comprising:

means for compressing said offset vector prior to appending it to said error signal.

11. Apparatus in accordance with claim 10 comprising:

means for encoding the signal that provides the least amount of data for communication to identify it as a compressed error signal and offset vector or a compressed current data set.

12. Apparatus in accordance with claim 8 wherein said means for comparing the amount of data in said compressed error signal and appended offset vector to the amount of data in said compressed current data set counts the number of bits in each to determine which has the fewest bits and therefore the least amount of data.

13. Apparatus in accordance with claim 8 comprising:

means for encoding the signal that provides the least amount of data for communication to identify it as a compressed error signal and offset vector or a compressed current data set.

14. A data receiver for recovering data communicated from the apparatus of claim 13 comprising:

means for identifying received data as a compressed error signal and offset vector or a compressed current data set;

means responsive to said identifying means for decompressing the received data;

means responsive to said identifying means for obtaining the appended offset vector from data identified as a compressed error signal;

means for applying said offset vector to the decompressed received data to recover a set of data corresponding to that from which an identified error signal was derived; and means for adding the recovered set of data to said error signal to recreate a current data set at the receiver.

15. A data receiver, for recovering digital still picture data from a compressed error signal indicative of the difference between a current data set representing an area of a still picture and an area of a previously received portion of said still picture, comprising:

means for identifying received data corresponding to said still picture as a compressed error signal or a compressed current data set;

means responsive to said identifying means for decompressing the received data;

means responsive to said identifying means for obtaining an offset vector that is appended to data identified as a compressed error signal;

means for applying said offset vector to data representing said previously received portion of said still picture to recover a set of said data corresponding to that from which an identified error signal was derived; and means for adding the recovered set of data to said error signal to recreate a current data set representing said area of said still picture at the receiver.

16. A data receiver in accordance with claim 15 further comprising:

means coupled to said offset vector obtaining means for decompressing said offset vector for use by said applying means.

* * * * *